(12) United States Patent
Asai et al.

(10) Patent No.: US 11,263,774 B2
(45) Date of Patent: Mar. 1, 2022

(54) THREE-DIMENSIONAL POSITION ESTIMATION DEVICE AND PROGRAM

(71) Applicant: AISIN SEIKI KABUSHIKI KAISHA, Kariya (JP)

(72) Inventors: Shoji Asai, Nagakute (JP); Shu Asami, Nagakute (JP); Kazutaka Hayakawa, Kariya (JP)

(73) Assignee: AISIN CORPORATION, Kariya (JP)

( * ) Notice: Subject to any disclaimer, the term of this patent is extended or adjusted under 35 U.S.C. 154(b) by 144 days.

(21) Appl. No.: 16/776,669

(22) Filed: Jan. 30, 2020

(65) Prior Publication Data
US 2020/0250849 A1    Aug. 6, 2020

(30) Foreign Application Priority Data
Jan. 31, 2019    (JP) .............................. JP2019-015930

(51) Int. Cl.
*G06T 7/73*    (2017.01)
*G06T 7/13*    (2017.01)
(Continued)

(52) U.S. Cl.
CPC .............. *G06T 7/73* (2017.01); *B60W 40/114* (2013.01); *G06K 9/00791* (2013.01); *G06K 9/4604* (2013.01); *G06T 7/13* (2017.01)

(58) Field of Classification Search
CPC .......... G06T 7/73; G06T 7/13; B60W 40/114; G06K 9/00791; G06K 9/4604
See application file for complete search history.

(56) References Cited

U.S. PATENT DOCUMENTS 9,462,446 B2 *   10/2016   Rudow ................. H04W 4/029
10,318,010 B2 *   6/2019   Horowitz ................ G06F 3/017
(Continued)

FOREIGN PATENT DOCUMENTS

EP    3 327 697 A1    5/2018
JP    2013-537995 A    10/2013
(Continued)

OTHER PUBLICATIONS

Jing Wang et al., "Visual SLAM Incorporating Wheel Odometer for Indoor Robots", 2017 36th Chinese Control Conference (CCC), Jul. 26-28, 2017.

*Primary Examiner* — Shefali D Goradia
(74) *Attorney, Agent, or Firm* — Sughrue Mion, PLLC (57) ABSTRACT

A three-dimensional position estimation device includes: a feature point detection unit detecting feature points from images captured by an image capturing device mounted in a moving object; a position-posture change amount calculation unit calculating change amounts of a position and a posture of the moving object; a feature point association unit associating feature points using a feature amount indicating a feature of the feature point; a three-dimensional position acquisition unit acquiring three-dimensional positions of the feature points and acquires a position and a posture of the image capturing device; a graph structure data generation unit generating graph structure data configured with feature point and image nodes, and a feature point and image capturing edges; an error function setting unit setting first and second error functions; and a graph structure data optimizing unit optimizing the three-dimensional position and the position and the posture of the image capturing device.

3 Claims, 5 Drawing Sheets

(51) Int. Cl.
   *G06K 9/46*      (2006.01)
   *B60W 40/114*    (2012.01)
   *G06K 9/00*      (2022.01)

(56) References Cited

U.S. PATENT DOCUMENTS

| | | | |
|---|---|---|---|
| 10,515,458 B1* | 12/2019 | Yakimenko | G06T 17/05 |
| 11,077,845 B2* | 8/2021 | Shalev-Shwartz | B60W 50/082 |
| 2008/0228433 A1* | 9/2008 | Meyer | G06T 7/70 |
| | | | 702/150 |
| 2009/0228204 A1* | 9/2009 | Zavoli | G01S 19/49 |
| | | | 701/532 |
| 2010/0017115 A1* | 1/2010 | Gautama | G01C 15/00 |
| | | | 701/533 |
| 2012/0121161 A1 | 5/2012 | Eade et al. | |
| 2016/0154408 A1 | 6/2016 | Eade et al. | |
| 2017/0030703 A1* | 2/2017 | Cosic | G01B 11/02 |
| 2017/0277197 A1* | 9/2017 | Liao | G06T 7/20 |
| 2018/0292832 A1* | 10/2018 | Bae | B62D 15/0285 |

FOREIGN PATENT DOCUMENTS

| | | |
|---|---|---|
| JP | 2014-222550 A | 11/2014 |
| JP | 2014-222551 A | 11/2014 |

* cited by examiner

VEHICLE COORDINATE SYSTEM

THREE-DIMENSIONAL POSITION ESTIMATION DEVICE AND PROGRAM

CROSS REFERENCE TO RELATED APPLICATIONS

This application is based on and claims priority under 35 U.S.C. § 119 to Japanese Patent Application 2019-015930, filed on Jan. 31, 2019, the entire contents of which are incorporated herein by reference.

TECHNICAL FIELD

This disclosure relates to a three-dimensional position estimation device and a program.

BACKGROUND DISCUSSION

In the related art, there is a technology of capturing an image of the surrounding environment by a camera mounted in a vehicle and creating an environmental maps from the captured image (Jing Wang, Zongying Shi, Yisheng Zhong, "Visual SLAM Incorporating Wheel odometer for Indoor Robots", 2017 36th Chinese Control Conference (CCC), 2017.).

In Jing Wang, Zongying Shi, Yisheng Zhong, "Visual SLAM Incorporating Wheel odometer for Indoor Robots", 2017 36th Chinese Control Conference (CCC), 2017, a feature point is detected from an image, and feature points of images captured at a plurality of places are associated using a local feature amount of the feature point. A position and a posture of a camera and a three-dimensional position of the feature point are calculated from the positions of the associated feature points on the image. Graph structure data configured with feature point nodes for defining three-dimensional positions of a plurality of feature points, camera nodes for defining the position and the posture of the camera at a plurality of image capturing places, a feature point edge for defining the position of the feature point on the image at each image capturing place, and an image capturing edge for defining the change amounts of the position and the posture of the vehicle between camera nodes adjacent to each other is generated. An environmental map is created by optimizing the graph structure data such that the sum of values of an error function calculated from the feature point edge and the image capturing edge is minimized.

However, in Jing Wang, Zongying Shi, Yisheng Zhong, "Visual SLAM Incorporating Wheel odometer for Indoor Robots", 2017 36th Chinese Control Conference (CCC), 2017, a method of setting a weight (information matrix $\Sigma_B$ in Jing Wang, Zongying Shi, Yisheng Zhong, "Visual SLAM Incorporating Wheel odometer for Indoor Robots", 2017 36th Chinese Control Conference (CCC), 2017.) of the error function at the image capturing edge is not described.

Therefore, in a case where it is not possible to acquire the change amounts of the position and the posture of a vehicle by odometry with high accuracy, for example, when the vehicle turns, there is a problem in that graph structure data is optimized such that the error function at the image capturing edge is minimized with respect to the measured value of the position change amount of the vehicle, which is obtained with low accuracy when the vehicle turns, and thus the environmental map created from the image of the in-vehicle camera is largely distorted.

Thus, a need exists for a three-dimensional position estimation device and a program which are not susceptible to the drawback mentioned above.

SUMMARY

A three-dimensional position estimation device according to an aspect of this disclosure includes a feature point detection unit that detects a plurality of feature points from each of a plurality of images captured by an image capturing device mounted in a moving object, a position-posture change amount calculation unit that calculates change amounts of a position and a posture of the moving object based on sensor information regarding the moving object, a feature point association unit that associates feature points in the plurality of images with each other using a feature amount indicating a feature of the feature point detected by the feature point detection unit, a three-dimensional position acquisition unit that acquires a three-dimensional position of each of the feature points associated with each other by the feature point association unit and acquires a position and a posture of the image capturing device for each of the plurality of images, a graph structure data generation unit that generates graph structure data configured with a feature point node for defining the three-dimensional position of the feature point for each feature point, an image capturing node for defining the position and the posture of the image capturing device that captures the image for each of the plurality of images, a feature point edge for joining the feature point node and the image capturing node and defining a position of the feature point at the feature point node on the image of the image capturing node, and an image capturing edge for joining adjacent image capturing nodes to each other and defining the change amount of the position and the posture of the moving object between images of the image capturing nodes, an error function setting unit that sets a first error function representing a projection error when a feature point at the feature point node joined by the feature point edge is projected onto the image of the image capturing node using the position and the posture of the image capturing device, which are defined by the image capturing node, for each feature point edge included in the graph structure data generated by the graph structure data generation unit, and sets a second error function representing an error between the change amounts of the position and the posture defined by the image capturing edge and a calculation result obtained by the position-posture change amount calculation unit for each image capturing edge included in the graph structure data, and a graph structure data optimizing unit that optimizes the three-dimensional position of the feature point, which is defined by each feature point node in the graph structure data and the position and the posture of the image capturing device, which are defined by each image capturing node, such that a sum of the first error function for each feature point edge and the second error function for each image capturing edge is minimized. The error function setting unit sets the second error function represented with a weight increasing as the change amount of the posture of the moving object, which is obtained by the position-posture change amount calculation unit and corresponds to the image capturing edge, is reduced, for each image capturing edge.

A computer-readable medium according to another aspect of this disclosure stores a program causing a computer to function as a feature point detection unit that detects a plurality of feature points from each of a plurality of images captured by an image capturing device mounted in a moving object, a position-posture change amount calculation unit that calculates change amounts of a position and a posture of the moving object based on sensor information regarding the moving object, a feature point association unit that associates feature points in the plurality of images with each other using a feature amount indicating a feature of the feature point detected by the feature point detection unit, a three-dimensional position acquisition unit that acquires a three-dimensional position of each of the feature points associated with each other by the feature point association unit and acquires a position and a posture of the image capturing device for each of the plurality of images, a graph structure data generation unit that generates graph structure data configured with a feature point node for defining the three-dimensional position of the feature point for each feature point, an image capturing node for defining the position and the posture of the image capturing device that captures the image for each of the plurality of images, a feature point edge for joining the feature point node and the image capturing node and defining a position of the feature point at the feature point node on the image of the image capturing node, and an image capturing edge for joining adjacent image capturing nodes to each other and defining the change amount of the position and the posture of the moving object between images of the image capturing nodes, an error function setting unit that sets a first error function representing a projection error when a feature point at the feature point node joined by the feature point edge is projected onto the image of the image capturing node using the position and the posture of the image capturing device, which are defined by the image capturing node, for each feature point edge included in the graph structure data generated by the graph structure data generation unit, and sets a second error function representing an error between the change amounts of the position and the posture defined by the image capturing edge and a calculation result obtained by the position-posture change amount calculation unit for each image capturing edge included in the graph structure data, and a graph structure data optimizing unit that optimizes the three-dimensional position of the feature point, which is defined by each feature point node in the graph structure data and the position and the posture of the image capturing device, which are defined by each image capturing node, such that a sum of the first error function for each feature point edge and the second error function for each image capturing edge is minimized. The error function setting unit sets the second error function represented with a weight increasing as the change amount of the posture of the moving object, which is obtained by the position-posture change amount calculation unit and corresponds to the image capturing edge, is reduced, for each image capturing edge.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described in detail with reference to the drawings.

Configuration of Map Creation System

Figure 1:
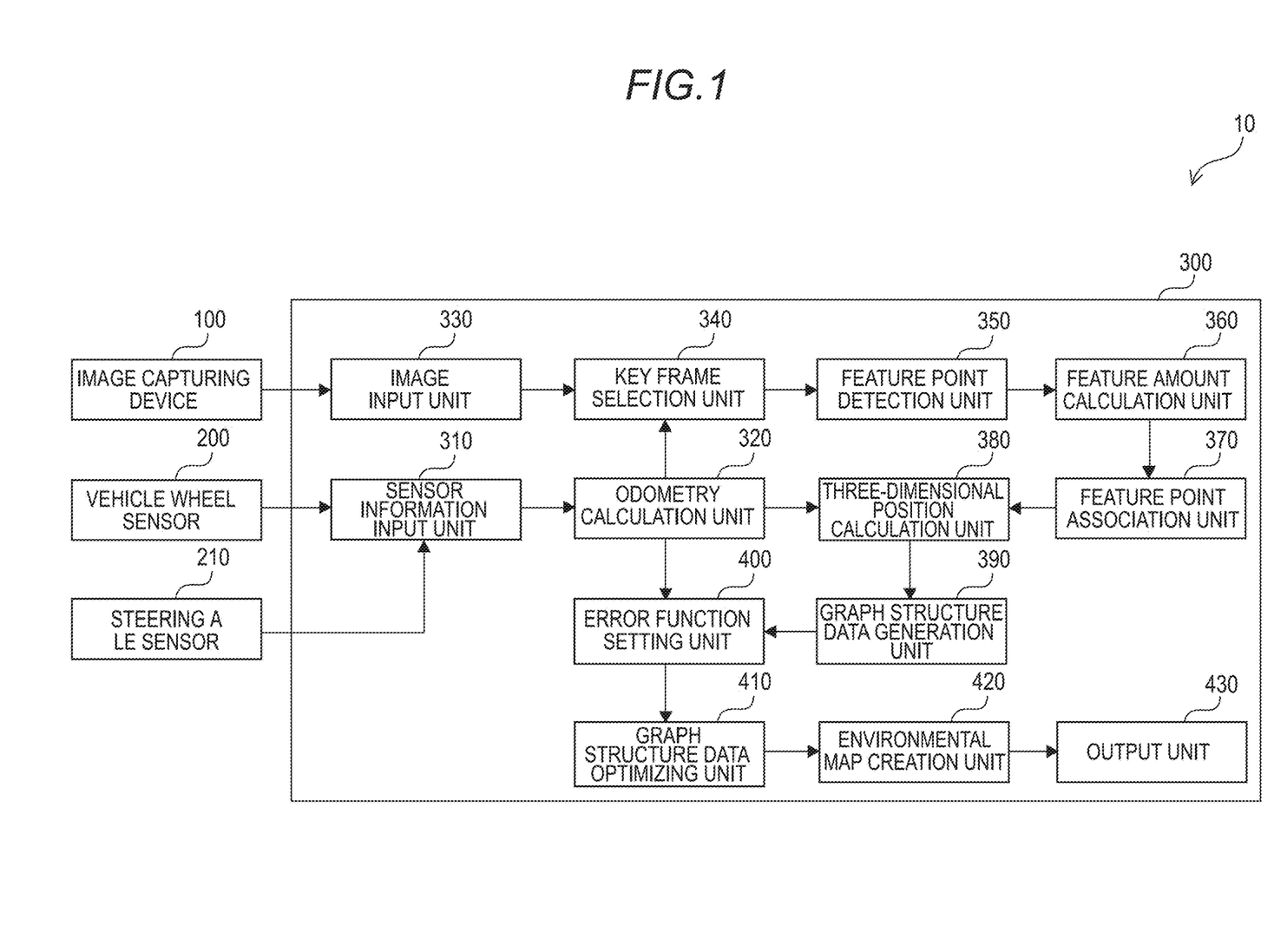
FIG. 1 is a block diagram illustrating an overall configuration in an embodiment disclosed here.

As illustrated in FIG. 1, according to an embodiment disclosed here, a map creation system 10 includes an image capturing device 100, a vehicle wheel sensor 200, a steering angle sensor 210, and a map creation device 300.

The image capturing device 100 is mounted in a moving object to capture an image of a surrounding environment. In the embodiment, a case where the moving object is a vehicle will be described as an example.

Specifically, the image capturing device 100 is a monocular camera provided at an upper portion or the like of the vehicle and captures an image of the front, the rear, or the like of the vehicle. For example, the image capturing device 100 is provided in the vicinity of the substantially center portion in a vehicle width direction and is disposed such that an optical axis of the image capturing device 100 is directed slightly below a horizontal direction.

In the embodiment, descriptions will be made using a monocular camera as the image capturing device 100. However, the embodiment is not limited thereto, and another type of camera, for example, a stereo camera may be provided.

The image capturing device 100 transfers the captured image to the map creation device 300.

The vehicle wheel sensor 200 detects a vehicle wheel speed of four wheels of the vehicle and transfers the detected vehicle wheel speed to the map creation device 300.

The steering angle sensor 210 detects a steering angle of the vehicle and transfers the detected steering angle of the vehicle to the map creation device 300.

The map creation device 300 includes a CPU, a RAM, and a ROM in which a program for performing a posture angle correction error estimation processing routine and a self-position estimation processing routine described later is stored. The map creation device is functionally configured as follows.

The map creation device 300 includes a sensor information input unit 310, an odometry calculation unit 320, an image input unit 330, a key frame selection unit 340, a feature point detection unit 350, a feature amount calculation unit 360, a feature point association unit 370, a three-dimensional position calculation unit 380, a graph structure data generation unit 390, an error function setting unit 400, a graph structure data optimizing unit 410, an environmental map creation unit 420, and an output unit 430.

The sensor information input unit 310 receives an input of the vehicle wheel speed detected by the vehicle wheel sensor 200 and an input of the steering angle detected by the steering angle sensor 210.

The sensor information input unit 310 transfers the received vehicle wheel speed and steering angle to the odometry calculation unit 320.

The odometry calculation unit 320 calculates a position change amount ($\Delta X_v$, $\Delta Y_v$) and a yaw angle change amount $\Delta \theta_v$ of the vehicle based on sensor information regarding the vehicle.

Specifically, firstly, the odometry calculation unit 320 calculates a traveling distance of the vehicle based on the vehicle wheel speed and calculates a turning radius of the vehicle based on the steering angle.

Figure 2:
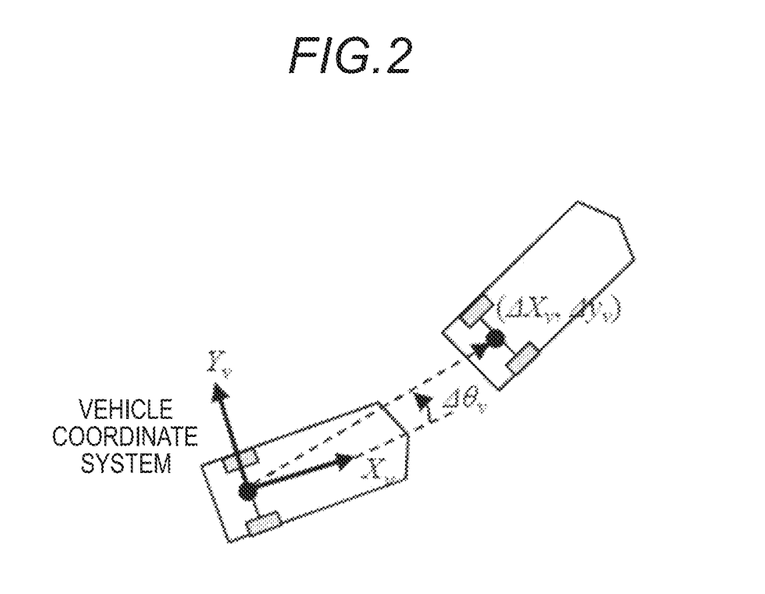
FIG. 2 is a diagram illustrating a change amount of a position and yaw angle of a vehicle.

Then, as illustrated in FIG. 2, the odometry calculation unit 320 calculates the position change amount ($\Delta X_v$, $\Delta Y_E$) and the yaw angle change amount $\Delta \theta_v$ of the vehicle in a vehicle coordinate system from the traveling distance and the turning radius of the vehicle.

The odometry calculation unit 320 transfers the calculated position change amount ($\Delta X_v$, $\Delta Y_v$) and yaw angle change amount $\Delta \theta_v$ to the three-dimensional position calculation unit 380 and the error function setting unit 400. The odometry calculation unit 320 transfers the traveling distance of the vehicle to the key frame selection unit 340 for each time.

The image input unit 330 receives an input of an image from the image capturing device 100.

The image input unit 330 transfers the received image to the key frame selection unit 340.

The key frame selection unit 340 selects a plurality of key frames to be used for creating an environmental map, among the images input from the image capturing device 100.

Specifically, firstly, the key frame selection unit 340 selects the image which has been received firstly from the image capturing device 100 as a first key frame.

Then, every time the traveling distance of the vehicle, which has been acquired from the odometry calculation unit 320 exceeds a predetermined value (for example, 0.1 m), the key frame selection unit 340 selects the image which has been received from the image capturing device 100 at the time at which the traveling distance exceeds the predetermined value, as the next key frame.

The key frame selection unit 340 transfers a plurality of selected key frames to the feature point detection unit 350.

The feature point detection unit 350 detects a plurality of feature points from each of a plurality of key frames captured by the image capturing device 100 mounted in the vehicle.

Specifically, the feature point detection unit 350 detects the plurality of feature points from an image pyramid of each key frame with an algorithm such as FAST (Reference 1).

[Reference 1] Raul Mur-Artal, J. M. M. Montiel and Juan D. Tardos, "ORB-SLAM: A Versatile and Accurate Monocular SLAM System.", IEEE Transactions on Robotics, vol. 31, no. 5, 2015, pp. 1147-1163.

The feature point detection unit 350 transfers the plurality of feature points of the key frame to the feature amount calculation unit 360 for each of the plurality of key frames.

The feature amount calculation unit 360 calculates the feature amount of each of the plurality of feature points in the key frame for each of the plurality of key frames.

Specifically, the feature amount calculation unit 360 calculates a local feature amount such as ORB (Reference 1), from the plurality of feature points for each of the plurality of key frames.

The feature amount calculation unit 360 transfers the plurality of feature points of the key frame and the feature amount of each of the plurality of feature points to the feature point association unit 370 for each of the plurality of key frames.

The feature point association unit 370 associates feature points in the consecutive key frames with each other using the feature amount indicating the feature of the feature point calculated by the feature amount calculation unit 360.

Specifically, the feature point association unit 370 associates the feature points in the consecutive key frames with each other using the feature amount of each feature point.

The feature point association unit 370 transfers the associated feature points to the three-dimensional position calculation unit 380 for each of the plurality of key frames.

The three-dimensional position calculation unit 380 calculates the three-dimensional position of each of the feature points associated with each other by the feature point association unit 370 and calculates the position and the posture of the image capturing device 100 for each of the plurality of images.

Specifically, the three-dimensional position calculation unit 380 calculates the three-dimensional position of each feature point based on association of the feature points in the current key frame and the previous key frame, in order from the second key frame.

In a case of the second key frame, firstly, the three-dimensional position calculation unit 380 calculates the change amounts (dimensionless amounts) of the position and the posture of the image capturing device 100 at the image capturing position in the first key frame and the image capturing position in the second key frame, using an eight-point algorithm and random sample consensus (RANSAC) between the first key frame and the second key frame. The three-dimensional position calculation unit 380 makes a dimension (determines an absolute scale) using the position change amount ($\Delta X_v$, $\Delta Y_v$) of the vehicle.

Figure 3:
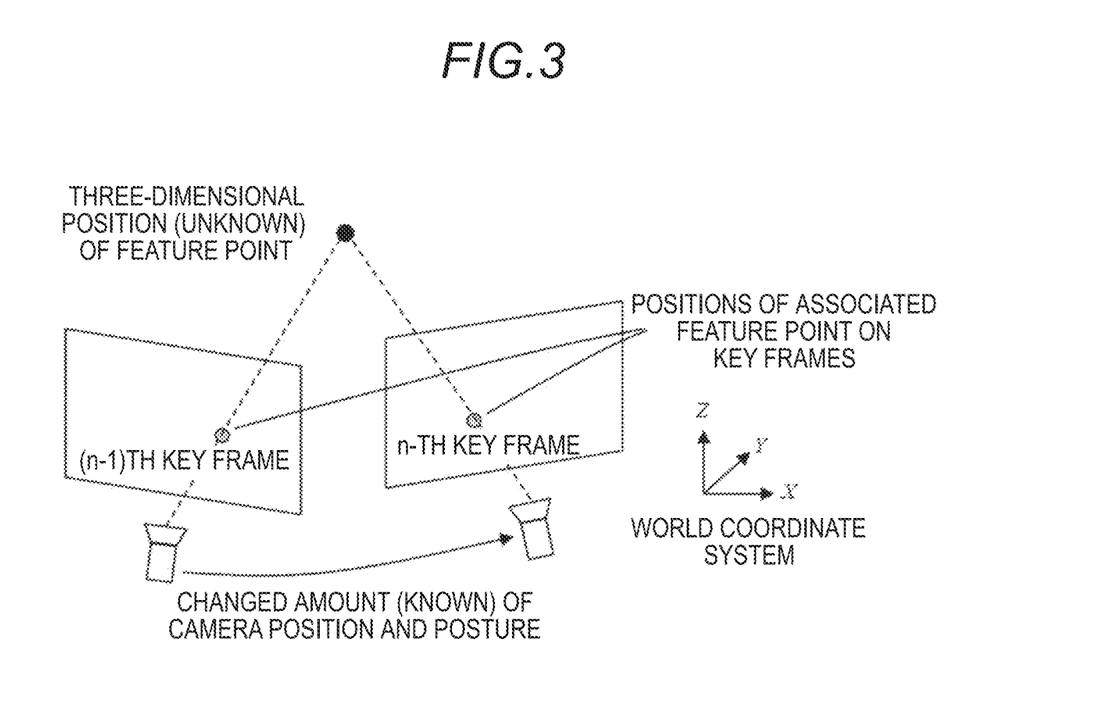
FIG. 3 is a diagram illustrating calculation of a three-dimensional position of a feature point.

Then, as illustrated in FIG. 3, the three-dimensional position calculation unit 380 calculates the three-dimensional position (world coordinate system) of the feature point based on the principle of triangulation, from the change amount of the positions of the associated feature points on the keyframes and the change amounts of the position and the posture of the image capturing device 100.

Figure 4:
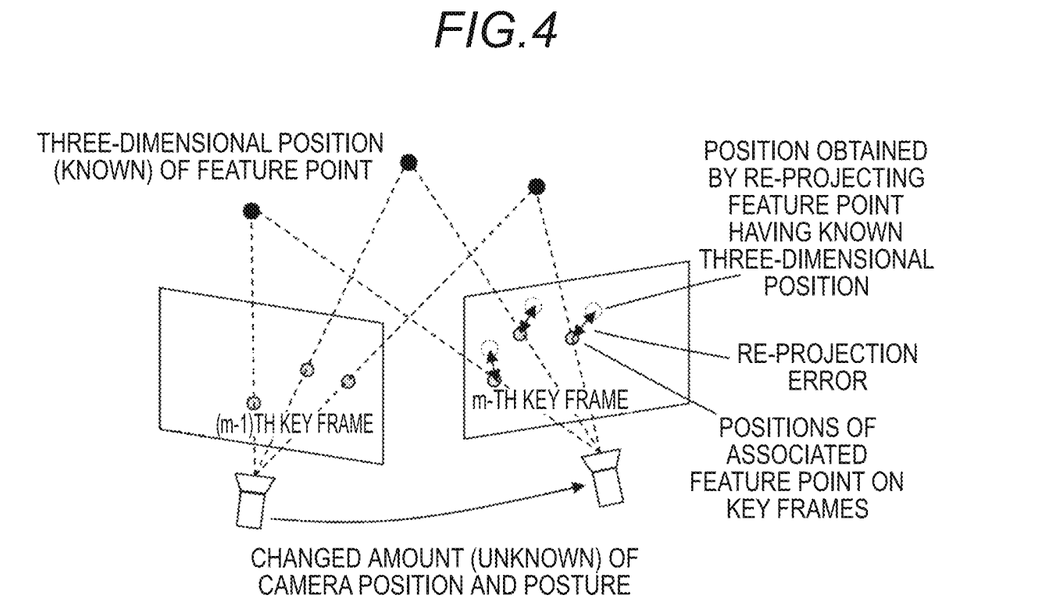
FIG. 4 is a diagram illustrating calculation of a change amounts of a position and a posture of a camera.

In a case of the third key frame and the subsequent, as illustrated in FIG. 4, firstly, the three-dimensional position calculation unit 380 extracts a feature point having a known three-dimensional position among feature points associated with each other between the current key frame and the previous key frame. Then, the three-dimensional position calculation unit calculates the change amounts of the position and the posture of the image capturing device 100, which cause the sum of a re-projection error to be minimized.

Then, similar to the second key frame, the three-dimensional position calculation unit 380 calculates the three-dimensional position of the feature point based on the principle of triangulation, from the change amount of the position of the feature point on the key frame and the change amounts of the position and the posture of the image capturing device 100, for each feature point having an unknown three-dimensional position among the feature points associated with each other between the current key frame and the previous key frame.

The three-dimensional position calculation unit 380 transfers the three-dimensional position obtained by calculation for each of the plurality of feature points, and the change amounts of the position and the posture of the image capturing device 100 at the image capturing position in the previous key frame of the current key frame, and the image capturing position in the current key frame, to the graph structure data generation unit 390.

The graph structure data generation unit 390 generates graph structure data configured with a feature point node for defining the three-dimensional position of the feature point for each feature point, an image capturing node for defining the position and the posture of the image capturing device 100 that captures the key frame for each of a plurality of key frames, a feature point edge for joining the feature point node and the image capturing node and defining the position of the feature point at the feature point node on the key frame of the image capturing node, and an image capturing edge for joining the adjacent image capturing nodes to each other and defining the change amounts of the position and the posture of the vehicle between the key frames of the image capturing node.

Figure 5:
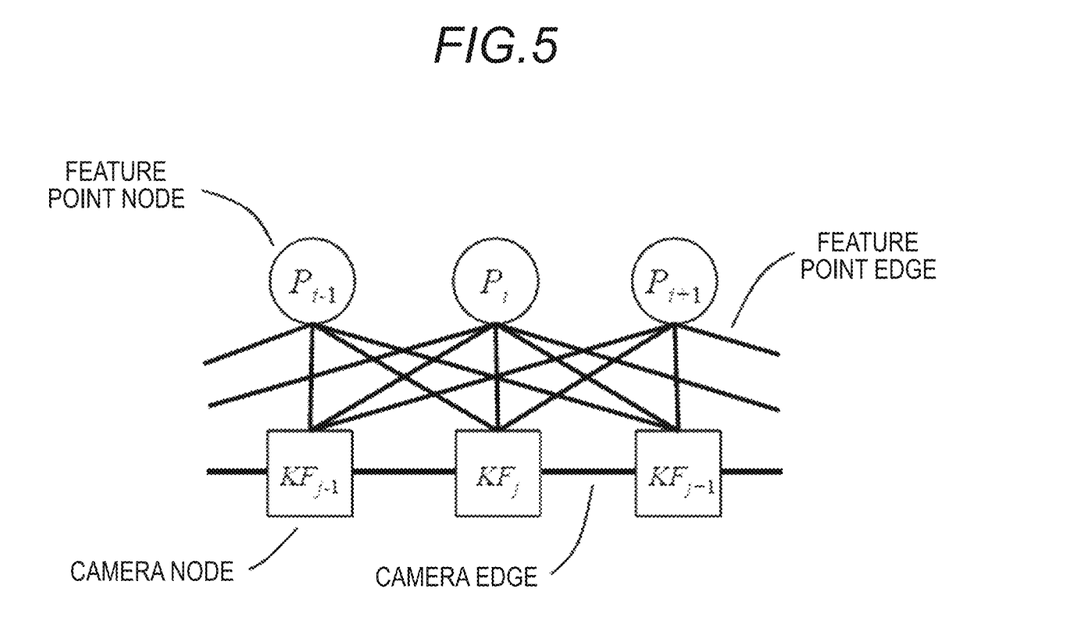
FIG. 5 is a diagram illustrating a configuration of graph structure data.

Specifically, as illustrated in FIG. 5, the graph structure data generation unit 390 generates the graph structure data configured with a feature point node for defining the three-dimensional position of a feature point $P_i$, a camera node for defining the position and the posture of the camera in a key frame $KF_j$, a feature point edge for defining the position of the feature point $P_i$ on the key frame $KF_j$, and an image capturing edge for defining the position change amount and the yaw angle change amount of the vehicle between key frames adjacent to each other.

Specifically, the graph structure data generation unit 390 generates the graph structure data with the three-dimensional position of each feature point, which is obtained by the three-dimensional position calculation unit 380.

The graph structure data generation unit 390 transfers the generated graph structure data to the error function setting unit 400.

The error function setting unit 400 sets a first error function $C_{Pij}$ representing a projection error when a feature point at the feature point node joined by the feature point edge is projected onto the image of the image capturing node using the position and the posture of the image capturing device 100, which are defined by the image capturing node, for each feature point edge included in the graph structure data generated by the graph structure data generation unit 390, and sets a second error function $C_{KFj}$ representing an error between the change amounts of the position and the posture defined by the image capturing edge and a calculation result obtained by the odometry calculation unit 320 for each image capturing edge included in the graph structure data.

Specifically, the error function setting unit 400 sets the first error function $C_{Pij}$ for the feature point edge as represented by Expressions (1) and (2).

$$C_{Pij} = e_{Pij}^T W_{Pij} e_{Pij} \quad (1)$$

$$W_{Pij} = w_{Pij} \begin{bmatrix} 1 & 0 \\ 0 & 1 \end{bmatrix} \quad (2)$$

$e_{Pij}$ is a 2×1 vector representing a re-projection error of the feature point $P_i$ in (x, y) coordinates in the key frame $KF_j$ and may be represented as follows. Here, ($x_{Pij}$, $y_{Pij}$) indicates practical coordinates of the feature point $P_i$, and "^" (hat symbol) indicates a calculated value when projected onto an image.

$$e_{pij} = \begin{bmatrix} x_{pij} - \hat{x}_{pij} \\ y_{pij} - \hat{y}_{pij} \end{bmatrix}$$

$W_{Pij}$ indicates a weight for the re-projection error and is set to be large for a feature point detected at a layer having high resolution in an image pyramid.

The error function setting unit 400 sets the second error function $C_{KFj}$ for the image capturing edge as represented by Expressions (3) and (4).

$$C_{KFj} = e_{KFj}^T W_{KFj} e_{KFj} \quad (3)$$

$$W_{KFj} = \begin{bmatrix} w_{Xj} & 0 & 0 \\ 0 & w_{Yj} & 0 \\ 0 & 0 & w_{\theta j} \end{bmatrix} \quad (4)$$

Here, $e_{KFj}$ is a 3×1 vector representing errors of the position change amount and the yaw angle change amount of the vehicle, which are converted from the change amounts of the position and the posture of the camera between key frames ($KF_j$–1) and $KF_j$, with respect to the measured value, and may be represented as follows. Here, "^" indicates a calculated value.

$$e_{KFj} = \begin{bmatrix} \Delta X_{vj} - \Delta \hat{X}_{vj} \\ \Delta Y_{vj} - \Delta \hat{Y}_{vj} \\ \Delta \theta_{vj} - \Delta \hat{\theta}_{vj} \end{bmatrix}$$

$w_{Xj}$ indicates the weight for an error of the position change amount of the vehicle in an X-direction. $w_{Yj}$ indicates the weight for an error of the position change amount of the vehicle in a Y-direction. $w_{\theta j}$ indicates the weight for an error of the yaw angle change amount of the vehicle.

Here, the error function setting unit 400 sets the second error function $C_{KFj}$ represented with the weights $w_{Xj}$, $w_{Yj}$, and $w_{\theta j}$ increasing as the yaw angle change amount $\Delta\theta_v$ of the vehicle, which corresponds to the image capturing edge and is obtained by the odometry calculation unit 320, is reduced, for each image capturing edge.

That is, the error function setting unit 400 sets the weights $w_{Xj}$, $w_{Yj}$, and $w_{\theta j}$ to increase for an image capturing edge in which the yaw angle change amount $\Delta\theta_v$ of the vehicle becomes smaller.

Here, setting may be performed to satisfy $w_{Xj}$, $w_{Yj}$. Thus, it is possible to save memory capacity.

The error function setting unit 400 transfers the graph structure data, the first error function $C_{Pij}$, and the second error function $C_{KFj}$ to the graph structure data optimizing unit 410.

The graph structure data optimizing unit 410 optimizes the three-dimensional position of the feature point, which is defined by each feature point node in the graph structure data and optimizes the position and the posture of the image capturing device 100, which are defined by each image capturing node, such that the sum of the values of the first error function $C_{Pij}$ for each feature point edge and the second error function $C_{KFj}$ for each image capturing edge is minimized.

Specifically, similar to a case of Jing Wang, Zongying Shi, Yisheng Zhong, "Visual SLAM Incorporating Wheel odometer for Indoor Robots", 2017 36th Chinese Control Conference (CCC), 2017, the graph structure data optimizing unit 410 optimizes the three-dimensional position of the feature point, which is defined by each feature point node in the graph structure data and optimizes the position and the posture of the image capturing device 100, which are defined by the image capturing node, such that the sum of the values of the first error function $C_{Pij}$ for each feature point edge and the second error function $C_{KFj}$ for each image capturing edge is minimized.

Here, since the weights $w_{Xj}$, $w_{Yj}$, and $w_{\theta j}$ of the second error function $C_{KFj}$ are set to increase for the image capturing edge in which the yaw angle change amount $\Delta\theta_v$ of the vehicle becomes smaller, the graph structure data is optimized such that the error function of the image capturing edge in which acquisition accuracy of the position change amount ($\Delta X_v$, $\Delta Y_v$) of the vehicle is relatively high is reduced. Thus, it is possible to totally improve the accuracy for the three-dimensional position of the feature point constituting the graph structure data and for the position and the posture of the camera.

The graph structure data optimizing unit 410 transfers the optimized graph structure data to the environmental map creation unit 420.

The environmental map creation unit 420 creates the environmental map configured to include three-dimensional position information of each feature point, based on the graph structure data optimized by the graph structure data optimizing unit 410.

Specifically, similar to the case of Jing Wang, Zongying Shi, Yisheng Zhong, "Visual SLAM Incorporating Wheel odometer for Indoor Robots", 2017 36th Chinese Control Conference (CCC), 2017, the environmental map creation unit 420 creates the environmental map configured to including three-dimensional position information of each feature point, based on the graph structure data optimized by the graph structure data optimizing unit 410. Here, the accuracy for the three-dimensional position of the feature point is higher than accuracy in the case of Jing Wang, Zongying Shi, Yisheng Zhong, "Visual SLAM Incorporating Wheel odometer for Indoor Robots", 2017 36th Chinese Control Conference (CCC), 2017, and thus it is possible to create a map having small distortion.

The environmental map creation unit 420 transfers the created environmental map to the output unit 430.

The output unit 430 outputs the environmental map created by the environmental map creation unit 420.

Operation of Map Creation Device 300

Figure 6:
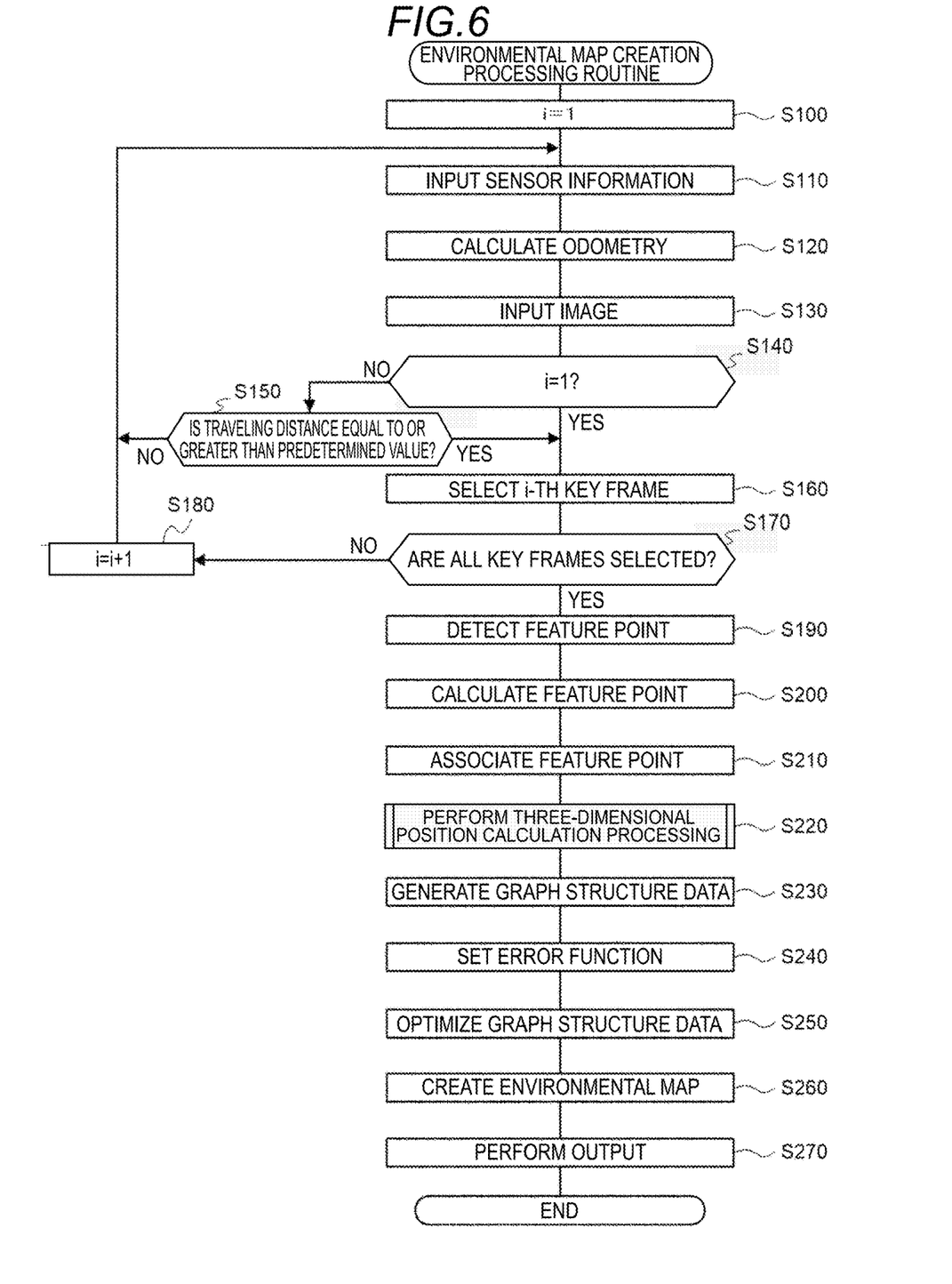
FIG. 6 is a flowchart illustrating details of an environmental map creation processing routine in the embodiment disclosed here.

Next, a map creation processing routine of the map creation device 300 in the embodiment will be described with reference to FIG. 6.

Firstly, in Step S100, the map creation device 300 sets i to 1. Here, i indicates a counter that counts the number of key frames to be selected.

In Step S110, the sensor information input unit 310 receives an input of the vehicle wheel speed detected by the vehicle wheel sensor 200 and an input of the steering angle detected by the steering angle sensor 210.

In Step S120, the odometry calculation unit 320 calculates the position change amount ($\Delta X_v$, $\Delta Y_v$) and the yaw angle change amount $\Delta\theta_v$ of the vehicle based on sensor information regarding the vehicle, which is obtained in Step S110.

In Step S130, the image input unit 330 receives an input of an image from the image capturing device 100.

In Step S140, the key frame selection unit 340 determines whether or not i is 1.

In a case where i is 1 (YES in Step S140), the process proceeds to Step S160.

In a case where i is not 1 (NO in Step S140), in Step S150, the key frame selection unit 340 determines whether or not the traveling distance of the vehicle is equal to or greater than the predetermined value.

In a case where the traveling distance is equal to or greater than the predetermined value (YES in Step S150), the process proceeds to Step S160.

In a case where the traveling distance is not equal to or greater than the predetermined value (NO in Step S150), the process returns to Step S110.

In Step S160, the key frame selection unit 340 selects the image acquired in Step S130 as an i-th key frame.

In Step S170, the key frame selection unit 340 determines whether or not all key frames are selected.

In a case where all the key frames are not selected (NO in Step S170), in Step S180, the key frame selection unit 340 adds 1 to i, and causes the process to return to Step S110.

In a case where all the key frames are selected (YES in Step S170), in Step S190, the feature point detection unit 350 detects a plurality of feature points from each of a plurality of key frames.

In Step S200, the feature amount calculation unit 360 calculates the feature amount of each of the plurality of feature points in the key frame for each of the plurality of key frames.

In Step S210, the feature point association unit 370 associates feature points in the plurality of key frames with each other using the feature amount indicating the feature of the feature point calculated in Step S200.

In Step S220, the three-dimensional position calculation unit 380 calculates the three-dimensional position of each of the feature points associated with each other in Step S210 and calculates the position and the posture of the image capturing device 100 for each of the plurality of key frames.

In Step S230, the graph structure data generation unit 390 generates graph structure data configured with a feature point node for defining the three-dimensional position of the feature point for each feature point, an image capturing node for defining the position and the posture of the image capturing device 100 that captures the key frame for each of a plurality of key frames, a feature point edge for joining the feature point node and the image capturing node and defining the position of the feature point at the feature point node on the key frame of the image capturing node, and an image capturing edge for joining the adjacent image capturing nodes to each other and defining the change amounts of the position and the posture of the vehicle between the key frames of the image capturing node.

In Step S240, the error function setting unit 400 sets a first error function $C_{Pij}$ representing a projection error when a feature point at the feature point node joined by the feature point edge is projected onto the key frame of the image capturing node using the position and the posture of the image capturing device 100, which are defined by the image capturing node, for each feature point edge included in the graph structure data generated in Step S230, and sets a second error function $C_{KFj}$ representing an error between the change amounts of the position and the posture defined by the image capturing edge and a calculation result obtained by the odometry calculation unit 320 for each image capturing edge included in the graph structure data.

In Step S250, the graph structure data optimizing unit 410 optimizes the three-dimensional position of the feature point, which is defined by each feature point node in the graph structure data and optimizes the position and the posture of the image capturing device 100, which are defined by each image capturing node, such that the sum of the values of the first error function $C_{Pij}$ for each feature point edge and the second error function $C_{KFj}$ for each image capturing edge is minimized.

In Step S260, the environmental map creation unit 420 creates the environmental map configured to include three-dimensional position information of each feature point, based on the graph structure data optimized in Step S250.

In Step S270, the output unit 430 outputs the environmental map created in Step S260.

Figure 7:
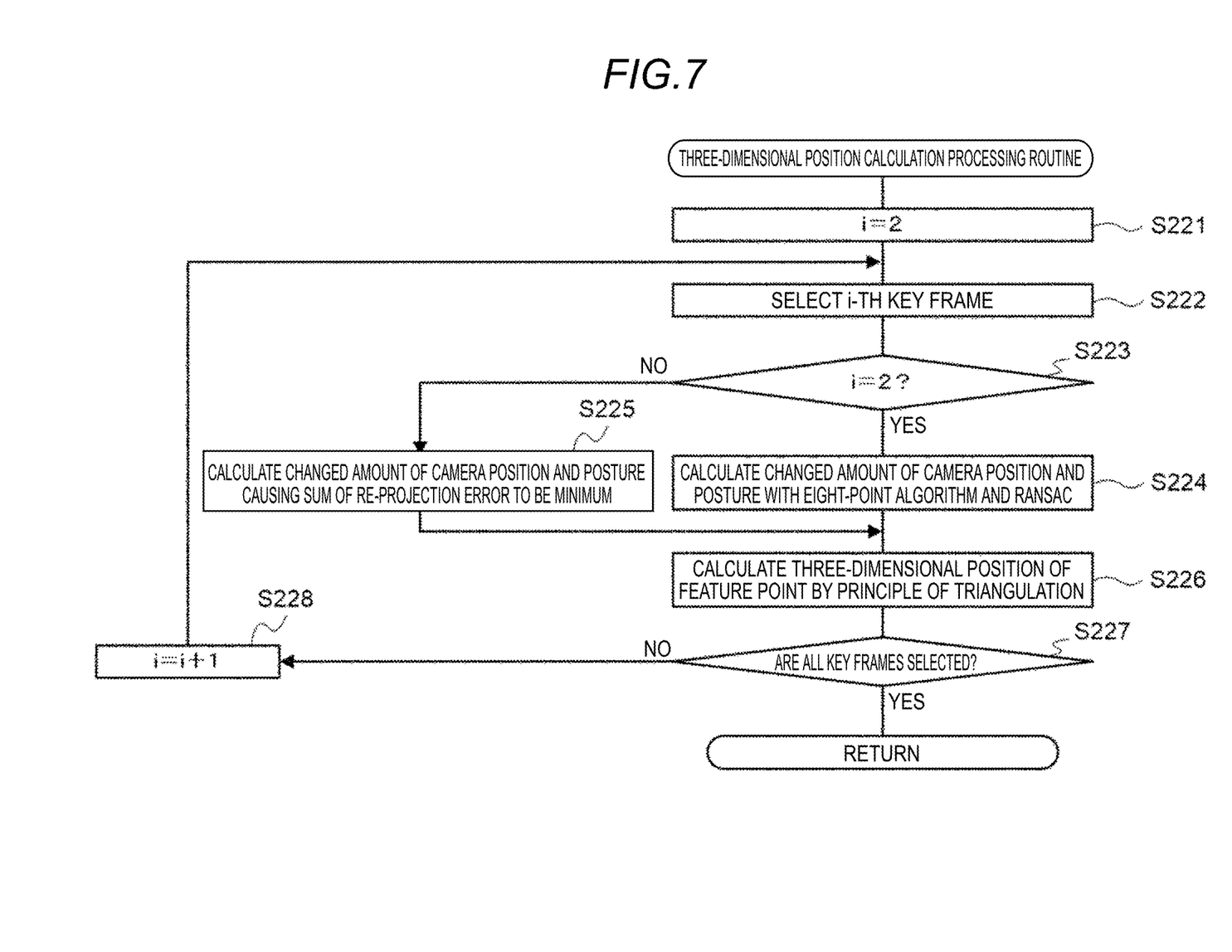
FIG. 7 is a flowchart illustrating details of a three-dimensional position calculation processing routine in the embodiment disclosed here.

Step S220 is realized by a three-dimensional position calculation processing routine illustrated in FIG. 7.

In Step S221, the three-dimensional position calculation unit 380 sets i to 2. Here, i indicates a counter representing the number of which a key frame is captured.

In Step S222, the three-dimensional position calculation unit 380 selects an i-th key frame.

In Step S223, the three-dimensional position calculation unit 380 determines whether or not i is 2.

In a case where i is 2 (YES in Step S227), in Step S224, the three-dimensional position calculation unit 380 calculates the change amounts (dimensionless amounts) of the position and the posture of the image capturing device 100 at the image capturing position in the first key frame and the image capturing position in the second key frame, using an eight-point algorithm and random sample consensus (RANSAC) between the first key frame and the second key frame. The three-dimensional position calculation unit 380 makes a dimension (determines an absolute scale) using the position change amount ($\Delta X_v$, $\Delta Y_v$) of the vehicle. Then, the process proceeds to Step S226.

In a case where i is not 2 (NO in Step S227), in Step S225, the three-dimensional position calculation unit 380 extracts a feature point having a known three-dimensional position among feature points associated with each other between the i-th key frame and the (i−1)th key frame, and calculates the change amounts of the position and the posture of the image capturing device 100, which cause the sum of a re-projection error to be minimized. Then, the process proceeds to Step S226.

In Step S226, the three-dimensional position calculation unit 380 calculates the three-dimensional position of the feature point based on the principle of triangulation, from the change amount of the position of the feature point on the i-th key frame and the change amounts of the position and the posture of the image capturing device 100, for each feature point having an unknown three-dimensional position among the feature points associated with each other between the i-th key frame and the (i−1)th key frame.

In Step S227, the three-dimensional position calculation unit 380 determines whether or not the processing is performed on all the key frames.

In a case where the processing is not performed on all the key frames (NO in Step S227), in Step S228, the three-dimensional position calculation unit 380 adds 1 to i and causes the process to return to Step S222.

In a case where the processing is performed on all the key frames (YES in Step S227), the process returns.

As described above, according to the map creation device according to the embodiment disclosed here, the graph structure data configured with the feature point node for defining the three-dimensional position of the feature point, the image capturing node for defining the position and the posture of the image capturing device, the feature point edge for joining the feature point node and the image capturing node and defining the position of the feature point at the feature point node on the image of the image capturing node, and the image capturing edge for joining the adjacent image capturing nodes to each other and defining the change amounts of the position and the posture of the moving object between the images of the image capturing nodes is generated. The first error function representing the projection error when the feature point at the feature point node joined by the feature point edge is projected onto the image of the image capturing node using the position and the posture of the image capturing device, which are defined by the image capturing node is set, and the second error function representing the error of the change amounts of the position and the posture defined by the image capturing edge is set to be represented with the weight increasing as the change amount of the posture of the moving object corresponding to the image capturing edge is reduced. The three-dimensional position of the feature point in the graph structure data, and the position and the posture of the image capturing device are optimized such that the sum of the values of the first error function and the second error function is minimized. Thus, it is possible to estimate the three-dimensional position of the feature point with high accuracy even in a case where it is not possible to acquire the change amounts of the position and the posture of a vehicle with high accuracy.

This disclosure is not limited to the above-described embodiment, and various modifications and applications may be made in a range without departing from the gist of this disclosure.

For example, in the embodiment, a case where the map creation device 300 is mounted in the vehicle is described as an example. However, the map creation device 300 may be configured as a server on the Internet.

In this case, the image capturing device 100, the vehicle wheel sensor 200, and the steering angle sensor 210 may be configured to transmit an image, the vehicle wheel speed, and the steering angle to the map creation device 300 by wireless communication or the like, respectively.

In this application specification, the embodiment in which the program is installed in advance is described. However, the program may be stored in a computer readable recording medium and be provided.

A three-dimensional position estimation device according to an aspect of this disclosure includes a feature point detection unit that detects a plurality of feature points from each of a plurality of images captured by an image capturing device mounted in a moving object, a position-posture change amount calculation unit that calculates change amounts of a position and a posture of the moving object based on sensor information regarding the moving object, a feature point association unit that associates feature points in the plurality of images with each other using a feature amount indicating a feature of the feature point detected by the feature point detection unit, a three-dimensional position acquisition unit that acquires a three-dimensional position of each of the feature points associated with each other by the feature point association unit and acquires a position and a posture of the image capturing device for each of the plurality of images, a graph structure data generation unit that generates graph structure data configured with a feature point node for defining the three-dimensional position of the feature point for each feature point, an image capturing node for defining the position and the posture of the image capturing device that captures the image for each of the plurality of images, a feature point edge for joining the feature point node and the image capturing node and defining a position of the feature point at the feature point node on the image of the image capturing node, and an image capturing edge for joining adjacent image capturing nodes to each other and defining the change amount of the position and the posture of the moving object between images of the image capturing nodes, an error function setting unit that sets a first error function representing a projection error when a feature point at the feature point node joined by the feature point edge is projected onto the image of the image capturing node using the position and the posture of the image capturing device, which are defined by the image capturing node, for each feature point edge included in the graph structure data generated by the graph structure data generation unit, and sets a second error function representing an error between the change amounts of the position and the posture defined by the image capturing edge and a calculation result obtained by the position-posture change amount calculation unit for each image capturing edge included in the graph structure data, and a graph structure data optimizing unit that optimizes the three-dimensional position of the feature point, which is defined by each feature point node in the graph structure data and the position and the posture of the image capturing device, which are defined by each image capturing node, such that a sum of the first error function for each feature point edge and the second error function for each image capturing edge is minimized. The error function setting unit sets the second error function represented with a weight increasing as the change amount of the posture of the moving object, which is obtained by the position-posture change amount calculation unit and corresponds to the image capturing edge, is reduced, for each image capturing edge.

A computer-readable medium according to another aspect of this disclosure stores a program causing a computer to function as a feature point detection unit that detects a plurality of feature points from each of a plurality of images captured by an image capturing device mounted in a moving object, a position-posture change amount calculation unit that calculates change amounts of a position and a posture of the moving object based on sensor information regarding the moving object, a feature point association unit that associates feature points in the plurality of images with each other using a feature amount indicating a feature of the feature point detected by the feature point detection unit, a three-dimensional position acquisition unit that acquires a three-dimensional position of each of the feature points associated with each other by the feature point association unit and acquires a position and a posture of the image capturing device for each of the plurality of images, a graph structure data generation unit that generates graph structure data configured with a feature point node for defining the three-dimensional position of the feature point for each feature point, an image capturing node for defining the position and the posture of the image capturing device that captures the image for each of the plurality of images, a feature point edge for joining the feature point node and the image capturing node and defining a position of the feature point at the feature point node on the image of the image capturing node, and an image capturing edge for joining adjacent image capturing nodes to each other and defining the change amount of the position and the posture of the moving object between images of the image capturing nodes, an error function setting unit that sets a first error function representing a projection error when a feature point at the feature point node joined by the feature point edge is projected onto the image of the image capturing node using the position and the posture of the image capturing device, which are defined by the image capturing node, for each feature point edge included in the graph structure data generated by the graph structure data generation unit, and sets a second error function representing an error between the change amounts of the position and the posture defined by the image capturing edge and a calculation result obtained by the position-posture change amount calculation unit for each image capturing edge included in the graph structure data, and a graph structure data optimizing unit that optimizes the three-dimensional position of the feature point, which is defined by each feature point node in the graph structure data and the position and the posture of the image capturing device, which are defined by each image capturing node, such that a sum of the first error function for each feature point edge and the second error function for each image capturing edge is minimized. The error function setting unit sets the second error function represented with a weight increasing as the change amount of the posture of the moving object, which is obtained by the position-posture change amount calculation unit and corresponds to the image capturing edge, is reduced, for each image capturing edge.

According to the three-dimensional position estimation device and the program according to the aspects of this disclosure, the feature point detection unit detects a plurality of feature points from each of a plurality of images captured by an image capturing device mounted in a moving object. The position-posture change amount calculation unit calculates change amounts of a position and a posture of the moving object based on sensor information regarding the moving object. The feature point association unit associates feature points in the plurality of images with each other using a feature amount indicating a feature of the feature point detected by the feature point detection unit. The three-dimensional position acquisition unit acquires a three-dimensional position of each of the feature points associated with each other by the feature point association unit and acquires a position and a posture of the image capturing device for each of the plurality of images. The graph structure data generation unit generates graph structure data configured with a feature point node for defining the three-dimensional position of the feature point for each feature point, an image capturing node for defining the position and the posture of the image capturing device that captures the image for each of the plurality of images, a feature point edge for joining the feature point node and the image capturing node and defining a position of the feature point at the feature point node on the image of the image capturing node, and an image capturing edge for joining adjacent image capturing nodes to each other and defining the change amount of the position and the posture of the moving object between images of the image capturing nodes.

The error function setting unit sets a first error function representing a projection error when a feature point at the feature point node joined by the feature point edge is projected onto the image of the image capturing node using the position and the posture of the image capturing device, which are defined by the image capturing node, for each feature point edge included in the graph structure data generated by the graph structure data generation unit, and sets a second error function representing an error between the change amounts of the position and the posture defined by the image capturing edge and a calculation result obtained by the position-posture change amount calculation unit for each image capturing edge included in the graph structure data. The graph structure data optimizing unit optimizes the three-dimensional position of the feature point, which is defined by each feature point node in the graph structure data and the position and the posture of the image capturing device, which are defined by each image capturing node, such that a sum of the first error function for each feature point edge and the second error function for each image capturing edge is minimized. The error function setting unit sets the second error function represented with a weight increasing as the change amount of the posture of the moving object, which is obtained by the position-posture change amount calculation unit and corresponds to the image capturing edge, is reduced, for each image capturing edge.

As described above, the graph structure data configured with the feature point node for defining the three-dimensional position of the feature point, the image capturing node for defining the position and the posture of the image capturing device, the feature point edge for joining the feature point node and the image capturing node and defining the position of the feature point at the feature point node on the image of the image capturing node, and the image capturing edge for joining the adjacent image capturing nodes to each other and defining the change amounts of the position and the posture of the moving object between the images of the image capturing nodes is generated. The first error function representing the projection error when the feature point at the feature point node joined by the feature point edge is projected onto the image of the image capturing node using the position and the posture of the image capturing device, which are defined by the image capturing node is set, and the second error function representing the error of the change amounts of the position and the posture defined by the image capturing edge is set to be represented with the weight increasing as the change amount of the posture of the moving object corresponding to the image capturing edge is reduced. The three-dimensional position of the feature point in the graph structure data, and the position and the posture of the image capturing device are optimized such that the sum of the values of the first error function and the second error function is minimized. Thus, it is possible to estimate the three-dimensional position of the feature point with high accuracy even in a case where it is not possible to acquire the change amounts of the position and the posture of a vehicle with high accuracy.

In the three-dimensional position estimation device, the position-posture change amount calculation unit may calculate a yaw angle change amount of the moving object based on a steering angle detected by a steering angle sensor mounted in the moving object, and the error function setting unit may set the second error function represented with a weight increasing as the yaw angle change amount of the moving object, which is obtained based on the calculation result by the position-posture change amount calculation unit and corresponds to the image capturing edge, is reduced.

As described above, according to the three-dimensional position estimation device and the program of this disclosure, effects as follows are obtained. That is, since the graph structure data configured with the feature point node for defining the three-dimensional position of the feature point, the image capturing node for defining the position and the posture of the image capturing device, the feature point edge for joining the feature point node and the image capturing node and defining the position of the feature point at the feature point node on the image of the image capturing node, and the image capturing edge for joining the adjacent image capturing nodes to each other and defining the change amounts of the position and the posture of the moving object between the images of the image capturing nodes is generated, the first error function representing the projection error when the feature point at the feature point node joined by the feature point edge is projected onto the image of the image capturing node using the position and the posture of the image capturing device, which are defined by the image capturing node is set, and the second error function representing the error of the change amounts of the position and the posture defined by the image capturing edge is set to be represented with the weight increasing as the change amount of the posture of the moving object corresponding to the image capturing edge is reduced, and the three-dimensional position of the feature point in the graph structure data, and the position and the posture of the image capturing device are optimized such that the sum of the values of the first error function and the second error function is minimized, it is possible to estimate the three-dimensional position of the feature point with high accuracy even in a case where it is not possible to acquire the change amounts of the position and the posture of a vehicle with high accuracy.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A three-dimensional position estimation device comprising: at least one processor configured to implement:
   a feature point detection unit that detects a plurality of feature points from each of a plurality of images captured by an image capturing device mounted in a moving object;
   a position-posture change amount calculation unit that calculates change amounts of a position and a posture of the moving object based on sensor information regarding the moving object;
   a feature point association unit that associates feature points in the plurality of images with each other using a feature amount indicating a feature of the feature point detected by the feature point detection unit;
   a three-dimensional position acquisition unit that acquires a three-dimensional position of each of the feature points associated with each other by the feature point association unit and acquires a position and a posture of the image capturing device for each of the plurality of images;
   a graph structure data generation unit that generates graph structure data configured with a feature point node for defining the three-dimensional position of the feature point for each feature point, an image capturing node for defining the position and the posture of the image capturing device that captures the image for each of the plurality of images, a feature point edge for joining the feature point node and the image capturing node and defining a position of the feature point at the feature point node on the image of the image capturing node, and an image capturing edge for joining adjacent image capturing nodes to each other and defining the change amount of the position and the posture of the moving object between images of the image capturing nodes;
   an error function setting unit that sets a first error function representing a projection error when a feature point at the feature point node joined by the feature point edge is projected onto the image of the image capturing node using the position and the posture of the image capturing device, which are defined by the image capturing node, for each feature point edge included in the graph structure data generated by the graph structure data generation unit, and sets a second error function representing an error between the change amounts of the position and the posture defined by the image capturing edge and a calculation result obtained by the position-posture change amount calculation unit for each image capturing edge included in the graph structure data; and a graph structure data optimizing unit that optimizes the three-dimensional position of the feature point, which is defined by each feature point node in the graph structure data and the position and the posture of the image capturing device, which are defined by each image capturing node, such that a sum of the first error function for each feature point edge and the second error function for each image capturing edge is minimized, wherein the error function setting unit sets the second error function represented with a weight increasing as the change amount of the posture of the moving object, which is obtained by the position-posture change amount calculation unit and corresponds to the image capturing edge, is reduced, for each image capturing edge.

2. The three-dimensional position estimation device according to claim 1, wherein the position-posture change amount calculation unit calculates a yaw angle change amount of the moving object based on a steering angle detected by a steering angle sensor mounted in the moving object, and the error function setting unit sets the second error function represented with a weight increasing as the yaw angle change amount of the moving object, which is obtained based on the calculation result by the position-posture change amount calculation unit and corresponds to the image capturing edge, is reduced.

3. A non-transitory computer-readable medium storing a program causing a computer to function as:

a feature point detection unit that detects a plurality of feature points from each of a plurality of images captured by an image capturing device mounted in a moving object;

a position-posture change amount calculation unit that calculates change amounts of a position and a posture of the moving object based on sensor information regarding the moving object;

a feature point association unit that associates feature points in the plurality of images with each other using a feature amount indicating a feature of the feature point detected by the feature point detection unit;

a three-dimensional position acquisition unit that acquires a three-dimensional position of each of the feature points associated with each other by the feature point association unit and acquires a position and a posture of the image capturing device for each of the plurality of images;

a graph structure data generation unit that generates graph structure data configured with a feature point node for defining the three-dimensional position of the feature point for each feature point, an image capturing node for defining the position and the posture of the image capturing device that captures the image for each of the plurality of images, a feature point edge for joining the feature point node and the image capturing node and defining a position of the feature point at the feature point node on the image of the image capturing node, and an image capturing edge for joining adjacent image capturing nodes to each other and defining the change amount of the position and the posture of the moving object between images of the image capturing nodes;

an error function setting unit that sets a first error function representing a projection error when a feature point at the feature point node joined by the feature point edge is projected onto the image of the image capturing node using the position and the posture of the image capturing device, which are defined by the image capturing node, for each feature point edge included in the graph structure data generated by the graph structure data generation unit, and sets a second error function representing an error between the change amounts of the position and the posture defined by the image capturing edge and a calculation result obtained by the position-posture change amount calculation unit for each image capturing edge included in the graph structure data; and a graph structure data optimizing unit that optimizes the three-dimensional position of the feature point, which is defined by each feature point node in the graph structure data and the position and the posture of the image capturing device, which are defined by each image capturing node, such that a sum of the first error function for each feature point edge and the second error function for each image capturing edge is minimized, wherein the error function setting unit sets the second error function represented with a weight increasing as the change amount of the posture of the moving object, which is obtained by the position-posture change amount calculation unit and corresponds to the image capturing edge, is reduced, for each image capturing edge.

* * * * *